M. J. IVERSON.
CAR FENDER.
APPLICATION FILED APR. 30, 1917.

1,236,088.

Patented Aug. 7, 1917.

Witnesses

Inventor
M. J. Iverson
By D. Swift & Co.
his Attorneys

UNITED STATES PATENT OFFICE.

MARY J. IVERSON, OF BEVERLY, MASSACHUSETTS.

CAR-FENDER.

1,236,088.  Specification of Letters Patent.  Patented Aug. 7, 1917.

Application filed April 30, 1917. Serial No. 165,569.

*To all whom it may concern:*

Be it known that I, MARY J. IVERSON, a citizen of the United States, residing at Beverly, in the county of Essex, State of Massachusetts, have invented a new and useful Car-Fender; and I do hereby declare the following to be a full, clear, and exact description of the invention, such as will enable others skilled in the art to which it appertains to make and use the same.

The invention relates to car fenders and the like and seeks to provide, as one of its objects a device of this character which may be permanently attached to the ends of a car and which will prevent all liability of the wheels passing over a person or other object struck by the car.

A further object is to provide a car fender which will project around beneath the steps and thus prevent the danger of persons being drawn under the car at the side.

A still further object is to provide a fender rigid in construction and having all its parts integrally connected together.

Other objects will appear from the detailed description which follows.

The drawings set forth a specific form of the invention but to this form it is not to be restricted. The right is reserved to make any changes or alterations suggested by the demands of practice, providing such changes or alterations are comprehended in spirit by the appended claim.

The same numerals of reference designate the same parts in each of the several figures of the drawings, wherein.

Figure 1:
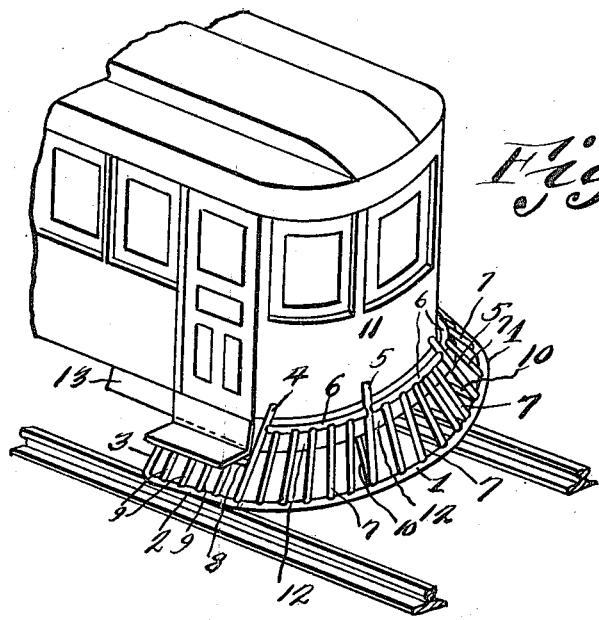
Figure 1 is the perspective view of the end of a street car showing the fender attached.
Figure 2:
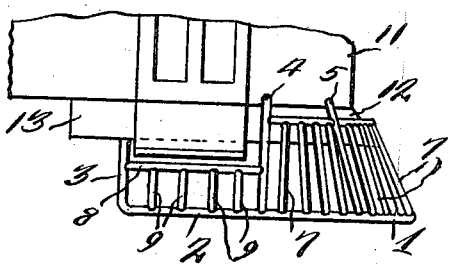
Fig. 2 is a side elevation of the fender. This figure shows the bottom end of the car to which the fender is attached.
Figure 3:
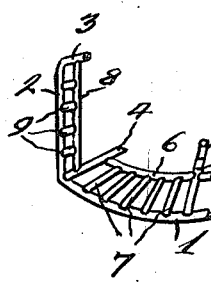
Fig. 3 is a plan view of one end of the fender before attachment to the car.

In the drawings, 1 represents an arched rod having at either end the straight portions 2 which terminate in the lateral extension 3. Rods 4 are welded to rod 1 at each of its junctions with the straight portions 2 and at uniformly spaced points between the rods 4, the rods 5 are welded to the rod 1. Close to their upper ends the rods 4 are connected with the rods 5 by arched rods 6 and the two rods 5 are similarly connected by an arched rod 6, all these connections being effected by welding. At uniformly spaced intervals around the arched rod 1 and the arched rods 6 are the diagonally disposed, downwardly extending rods 7. These rods 7 have their ends welded to both the rods 1 and 6.

Between the lateral extensions 3 and the rods 4, horizontal rods 8 are secured by welding, and between these rods 8 and the straight portions 2 the short rods 9 are affixed, these short rods being uniformly spaced along the straight portions 2 and being secured to the latter and rods 8 by welding.

Each of the rods 5 is provided with a brace-rod 10 welded to it at the point where it adjoins the arched rod 1.

The invention comprises the combination of rods referred to all integrally united by welding, the assembled fender presenting the shape shown in Fig. 1. The fender is secured to the front of the car (and a similar fender on the rear) by welding. The upper ends of the rods 4 and 5 penetrate the front dash 11 and are welded to the dash at the points where they penetrate. The lateral extensions 3 are welded to the beams 13 which support the platform of the car and the brace-rods 10 are welded on the bottom of the end sill. The attachment of the fender to the car by welding is designed to be accomplished with an acetylene gas flame.

It will be seen that the fender is so disposed as to completely protect the front of the car, extending as it does down close to the rail. The extensions which project around below the platform steps are so disposed as to tend to throw a person or object hit by the car to one side as the car advances, this tendency being the result of the positions in which the extensions are disposed, the extensions being more inclined from the vertical at the rear than at the point where they adjoin the fender proper.

What is claimed is:

A fender for street cars and the like comprising an arched rod having a straight portion at either end and a lateral extension at the end of each straight portion, straight rods integrally connected with the arched rod and uniformly portion of the arched rod and uniformly spaced on the arched portion, arched rods connecting the straight rods near their upper ends, a plurality of straight rods connected between the first mentioned arch rod and said last named arch rods, straight rods connecting each lateral extension with one of said straight rods, a plurality of short straight rods connected between the straight portions and the straight rods adjoined to the lateral extensions, and brace-rods connected with the intermediate straight rods, the straight rods being designed for welding to a car dash, the brace-rods being designed for welding to the end sill of a car, the lateral extensions being designed for welding to the platform beams of a car, whereby the fender as a whole is permanently secured to a car.

In testimony whereof I have signed my name to this specification in the presence of two subscribing witnesses.

MARY J. IVERSON.

Witnesses:
 LEONORA I. STEWART,
 CARRIE A. APPLETON.